(12) United States Patent
Dhersin

(10) Patent No.: US 11,676,737 B2
(45) Date of Patent: Jun. 13, 2023

(54) ENCAPSULATION COMPOSITION FOR STORAGE OR CONFINEMENT OF WASTE WHICH IS TOXIC TO HEALTH AND/OR THE ENVIRONMENT

(71) Applicant: POLYNT COMPOSITES FRANCE, Drocourt (FR)

(72) Inventor: Christine Dhersin, Sailly Labourse (FR)

(73) Assignee: Polynt Composites France, Drocourt (FR)

( * ) Notice: Subject to any disclaimer, the term of this patent is extended or adjusted under 35 U.S.C. 154(b) by 1491 days.

(21) Appl. No.: 15/746,245

(22) PCT Filed: Jul. 21, 2016

(86) PCT No.: PCT/FR2016/051904
§ 371 (c)(1),
(2) Date: Jan. 19, 2018

(87) PCT Pub. No.: WO2017/013374
PCT Pub. Date: Jan. 26, 2017

(65) Prior Publication Data
US 2018/0211735 A1    Jul. 26, 2018

(30) Foreign Application Priority Data
Jul. 21, 2015   (FR) ...................... 1556907

(51) Int. Cl.
| G21F 9/30 | (2006.01) |
| C08G 59/46 | (2006.01) |
| C08G 59/50 | (2006.01) |
| C08G 59/54 | (2006.01) |
| C08G 59/60 | (2006.01) |
| C08L 63/00 | (2006.01) |
| G21F 9/16 | (2006.01) |
| C08G 59/06 | (2006.01) |
| C08L 77/08 | (2006.01) |
| C08L 79/02 | (2006.01) |

(52) U.S. Cl.
CPC ............ *G21F 9/307* (2013.01); *C08G 59/46* (2013.01); *C08G 59/5033* (2013.01); *C08G 59/54* (2013.01); *C08G 59/60* (2013.01); *C08L 63/00* (2013.01); *G21F 9/167* (2013.01)

(58) Field of Classification Search
None
See application file for complete search history.

(56) References Cited

U.S. PATENT DOCUMENTS

| 6,224,710 | B1 * | 5/2001 | Rinde | .................... C08G 59/18 |
| | | | | 428/420 |
| 8,563,796 | B2 | 10/2013 | Dhersin | |
| 2011/0124943 | A1 | 5/2011 | Dhersin | |
| 2015/0094400 | A1 * | 4/2015 | Zheng | .................... C08G 59/60 |
| | | | | 523/222 |

FOREIGN PATENT DOCUMENTS

| CN | 1740207 A | * | 3/2006 | |
| FR | 2825182 A1 | | 11/2002 | |
| FR | 2931832 A1 | * | 12/2009 | ............... G21F 9/34 |
| FR | 2977894 A1 | | 1/2013 | |
| WO | WO 2005/123801 A1 | | 12/2005 | |
| WO | WO 2010/004189 A2 | | 1/2010 | |

OTHER PUBLICATIONS

International Search Report issued in International Patent Application No. PCT/FR2016/051904, dated Sep. 23, 2016 (3 pages).

* cited by examiner

*Primary Examiner* — Randy P Gulakowski
*Assistant Examiner* — Ha S Nguyen
(74) *Attorney, Agent, or Firm* — Neal, Gerber & Eisenberg LLP

(57) ABSTRACT

The invention relates to an encapsulation composition for the storage or the confinement of waste which is toxic to health and/or the environment, comprising a resin composition containing at least one epoxy resin, and a hardening composition containing at least one polyamidoamine and at least one aromatic polyamine, said encapsulation composition having an aromaticity rate which is equal to, or higher than, 35%. The invention also relates to the use of said composition for encapsulating said waste.

24 Claims, No Drawings

ENCAPSULATION COMPOSITION FOR STORAGE OR CONFINEMENT OF WASTE WHICH IS TOXIC TO HEALTH AND/OR THE ENVIRONMENT

CROSS REFERENCE TO RELATED APPLICATIONS

This application is a 35 U.S.C. 371 National Phase of PCT Application No. PCT/FR2016/051904 filed Jul. 21, 2016, which claims benefit to FR Application No. 1556907 filed Jul. 21, 2015, the disclosure of which is hereby incorporated by reference in its entirety.

The invention relates to an encapsulation composition for the storage or confinement of waste that is toxic to health and/or the environment, comprising a resin composition containing at least one epoxy resin, and a hardening composition containing at least one polyamidoamine and at least one aromatic polyamine, said encapsulation composition having a degree of aromaticity greater than or equal to 35%.

The invention also relates to the use of this composition for encapsulating said waste.

The terms "encapsulation composition", "matrix" or "confinement matrix" will be used interchangeably throughout the description.

The ion-exchange resins used for purifying the water from nuclear installations, which, after use and loss of effectiveness must be stored, as they have trapped radioelements and therefore have a certain level of radioactivity. Other elements used in nuclear power stations, such as magnesium rods, are also contaminated after use.

Other wastes, in particular non-radioactive, such as heavy metals or materials contaminated with heavy metals, require confinement to prevent their dissemination in the environment.

This type of waste that is toxic to health and/or the environment, in particular radioactive waste, must be stored in accordance with safety rules in force.

A number of techniques are known for encapsulating said waste for the purpose of storage, involving the use of epoxy or polyester encapsulation resins, or vitrification techniques for inactivating said waste.

By "encapsulation" is meant a type of containment that meets specific confinement tests. The terms "containment" or "confinement" will be used interchangeably, in particular by reference to the terminology used in the field of nuclear engineering.

Application FR 2 825 182 describes a matrix system for the encapsulation and storage of a hazardous product, in which the encapsulation composition comprises an epoxy resin and a water-absorbing substance, allowing encapsulation of ion-exchange resins with high residual water content. This application mentions, among others compounds, the use of polyaminoamide as hardener in an encapsulation composition based on epoxy resin (p.6, 1.11-17). Example 1 describes a matrix system in which the hardener is a polyaminoamide. Taking into account the composition of the block of waste described in Example 1, p.9, the cross-linked polymer obtained has a low cross-link density and will have low resistance to radiation as well as low mechanical strength (compressive strength). This low cross-link density is explained by the fact that the cross-link nodes that create the three-dimensional network are far apart, in particular due to the high level of fillers in the final block of waste (64 parts by weight of waste and 5 parts by weight of absorbent silica).

A process described in patent U.S. Pat. No. 4,599,196 implements preliminary treatment of cationic ion-exchange resins in order to attenuate their acidic character, the hardening composition having to be adapted as a function of this acidity.

Patent U.S. Pat. No. 5,416,251 describes a method for encapsulating ion-exchange resin in which the runoff water is blocked by a hydrophobic agent forming a film, in order to avoid inhibition of the reaction between the resin and the hardener.

Application FR2931832 describes a method for encapsulating hazardous waste in which the hardening composition comprises a hardener constituted by a mixture of aromatic polyamine and cycloaliphatic polyamine. The aromatic polyamine mentioned in the examples, namely oligomeric methylenedianiline (or MDA), CAS 25214-70-4, is classified Carcinogenic 1B and mutagenic 2 according to the CLP regulations mentioned above. This formulation is subject to a requirement to find substitutes within the scope of the regulations in force in France.

In this application, the combination of aromatic polyamines and cycloaliphatic polyamines makes it possible to optimize the kinetics of the encapsulation reaction.

Application EP2297221 responded to the need to replace the MDA which is classified as CMR. It describes a composition and a method of encapsulation for the storage of waste that is toxic to health and/or the environment devoid of aromatic amine.

Since 2007, the REACH regulation (Regulation (EC) No. 1907/2006 of 18 Dec. 2006, concerning the registration, evaluation and authorization of chemicals, as well as the restrictions applicable to these substances) defines new classifications of substances.

Thus, the classification "SVHC" ("Substance of Very High Concern") is defined by the European harmonized classifications as stated in annex VI part 3 of the Regulation (EC) No. 1272/2008 of 16 Dec. 2008 called "CLP" relating to the classification, labelling and packaging of substances and mixtures, amending and repealing Directives 67/548/EEC and 1999/45/EC, and amending Regulation (EC) No. 1907/2006.

In this context, it is required that the composition employed for encapsulating the toxic waste complies not only with the technical specifications, in particular in terms of resistance to ionizing radiation (radio-resistance) but also, preferably, with this new regulation by using substances that are not SVHC, nor likely to become so with development of the regulations.

There is therefore a need for an encapsulation composition for toxic waste that complies with a set of criteria so that the encapsulated waste block is permitted to be stored as final waste, namely, which is resistant to radiation, can be handled easily at ambient temperature and has the safety properties required in this respect, or even improved relative to the existing compositions, in particular with respect to compressive strength and leaching, without requiring any special preliminary treatment of the waste to be treated, and which meets the regulatory requirements in force. It is in particular also desired that the epoxy-amine reaction is not affected by the presence of water, moreover in the absence of any supplementary addition of a specific water-absorbing agent, in addition to the overall epoxy-amine reaction system (i.e. apart from the reactants of the epoxy-amine system). The addition of an absorbent has an effect of diluting the encapsulation matrix and therefore weakens the three-dimensional network, which is contrary to the required objective.

The technical problem to be solved was, in particular, to define a combination of components within the encapsulation composition that makes it possible, simultaneously:

to ensure a sufficient degree of aromaticity to meet the required technical specifications, and therefore employing a compound of the aromatic amine type in order to ensure the properties of radio-resistance and mechanical strength of the cross-linked block, to comply with the mandatory regulations in force, which in fact do not allow the use of certain compounds that would have provided a satisfactory result with respect to technical properties, and to comply with industrial constraints, in particular in terms of ease of handling (ambient temperature) and kinetics (controlled exothermic reactivity below 90° C. in the case of wet waste).

It has now been found that the use of an encapsulation composition comprising a resin composition containing at least one epoxy resin and a hardening composition containing at least one polyamidoamine and at least one aromatic polyamine, said encapsulation composition having a degree of aromaticity greater than or equal to 35%, allows these objectives to be achieved and meets all of the criteria mentioned above.

Advantageously, the choice of components of the encapsulation composition (polyamidoamine, aromatic polyamine and epoxy resin) provides controlled cross-linking kinetics and exothermic conditions below 90° C., regardless of the quantities of encapsulation composition employed, in particular in the case of the inerting of waste containing water such as ion-exchange resins (which may contain up to 63% of water after draining). The aim is to avoid reaching the boiling point of water during cross-linking, which would impair the final properties of the cross-linked package.

By "cross-linking" is meant the branching of polymer chains between one another by bridges or chemical bonds, in order to constitute a three-dimensional macromolecular network of infinite molecular weight and having physicochemical properties different from the initial polymer. In the case of thermosetting resins, these pass from a pasty state to a solid state. Cross-linking is the culmination of polymerization and is an irreversible process resulting in the production of a three-dimensional polymer that is solid, infusible and insoluble.

In the case of epoxy resins, cross-linking takes place by reaction with a hardener, or, more precisely, by reaction of an epoxy resin composition with a hardening composition (based on amines).

Therefore, according to a first aspect, the invention relates to an encapsulation composition for the storage or confinement of waste that is toxic to the environment and/or to health, comprising:

a resin composition containing at least one epoxy resin, and a hardening composition containing at least one polyamidoamine and at least one aromatic polyamine, said encapsulation composition having a degree of aromaticity greater than or equal to 35%.

According to a preferred aspect, said hardening composition consists of at least one polyamidoamine and at least one aromatic polyamine.

Advantageously, said encapsulation composition has a degree of aromaticity from 35% to 45%.

The degree of aromaticity of the encapsulation composition is calculated as follows and is expressed as a percentage:

$$\frac{\text{Sum of the molecular weights of the aromatic rings present in the encapsulation composition and included in the polymer chain}}{\text{Sum of the molecular weights of all of the components of the encapsulation composition}}$$

Preferably, for the purposes of the invention, said aromatic rings present in the encapsulation composition and included in the polymer chain are benzene rings.

As mentioned above, formation of a network of polymer chains by cross-linking (branching of polymer chains together by bridges or chemical bonds) is the culmination of polymerization and is an irreversible process resulting in the production of a three-dimensional polymer that is solid, infusible and insoluble and has the required technical properties.

The degree of aromaticity of the encapsulation composition derived from the aromatic rings included in the polymer chains is an essential component of this polymer network, in particular as regards resistance to ionizing radiation.

Said encapsulation composition may be devoid any water-absorbing substance added in addition to the reactive compounds of the epoxy-amine system. In fact, the polyamidoamines present in the reaction composition constitute one of the reactants of the epoxy-amine system, and may react with water, by hydrolysis, which makes it possible to overcome the problem of the influence of the runoff water on hardening (i.e. on the cross-linking reaction between epoxy and amine).

Preferably, the encapsulation composition comprises from 50 to 80% by weight, in particular 70 to 80% by weight, of composition based on epoxy resin and from 20 to 50% by weight, in particular 20 to 30% by weight, of the hardening composition.

Hardening Composition

The hardening composition that can be used in the encapsulation composition according to the invention comprises at least one polyamidoamine, and at least one aromatic polyamine.

a) Polyamidoamine

By "polyamidoamine" is meant the product of the reaction between an aliphatic polyamine and a fatty acid, having terminal and/or lateral amine functions (amidation with an excess of amine relative to $CO_2H$).

The use of the polyamidoamines in the hardening composition offers many advantages:

they are not classified among the "CMR" products (chemicals substances that are carcinogenic and/or mutagenic and/or toxic for reproduction), or likely to become so with changes in the regulations;

the simultaneous presence of a large number of amine functions ensures the formation of numerous C—N bonds with the epoxy groups of the resin, allowing the formation of a more compact epoxy network: this results in improved stability with respect to radiation and to mechanical stresses of the compressive type (resistance to deformation) and, more particularly, compressive strength that is unaffected after exposure to ionizing radiation, their cross-linking kinetics, relatively slow and controlled (controlled reactivity), makes it possible to control the reactivity during cross-linking without the reactivity of the reactive components being affected by the possible presence of water, in the absence of any water-absorbing substance other than the reactive components of the epoxy-amine system, they can easily be utilized at ambient temperature (10-40° C., preferably 15-30° C.), owing to their low viscosity, preferably below 4 Pa·s at 25° C., by simple mixing of the components.

Preferably at least one polyamidoamine is used that has a pot life until gelation, i.e. up to viscosity tending to infinity at 25° C. of 400 to 700 min, measured by the Gel timer method on 150 g of mixture with a diglycidyl ether of bisphenol A (DGEBA) epoxy resin.

Advantageously, said polyamidoamidoamine or said mixture of polyamidoamines has a viscosity at 25° C. of the order of 0.2 to 2 Pa·s.

Preferably, at least one polyamidoamine will be used that has an amine index, corresponding to an equivalent weight per active hydrogen, of the order of 90 to 110 g/H.

Advantageously, said polyamidoamine is the reaction product of one or more polyethylene polyamine(s) with one or more mono- or polyunsaturated fatty acid(s), and preferably oligoethylene amines with mono- or polyunsaturated $C_{12}$-$C_{18}$ fatty acids.

Polyamidoamines that are particularly preferred for the purposes of the invention can be, for example, selected from the following products, which are products of the reaction between:
  one or more polyethylene polyamine(s) (aliphatic amine(s) by definition) preferably selected from the oligoethylene amines, and more preferably from the polyethylenetetramines and the polyethylenepentamines, for example diethylenetriamine, triethylenetetramine, tetraethylenetetramine, tetraethylenepentamine or bis(3-aminopropyl)ethylenediamine, and
  one or more mono- or polyunsaturated $C_{12}$-$C_{18}$ fatty acid(s) (mono- and/or polyacids), for example oleic acid, linoleic acid, linolenic acid, palmitoleic acid or myristic acid, preferably the polyunsaturated fatty acids of vegetable origin, such as the fatty acids of vegetable origin contained in the distillation residues from wood, denoted by the term "Tall oil", linoleic acid and alpha- or gamma-linolenic acid being particularly preferred.

Moreover, the amidoamines may be in reversible equilibrium with the imidazoline cyclized form. A polyamidoamine or a mixture of polyamidoamines rich in imidazoline(s) will preferably be used, the reactivity of which makes it possible to regulate the rate of the cross-linking reaction, and which, advantageously, are able to react with the water supplied by the wet waste.

A polyamidoamine that is preferred for the purposes of the invention is the product of the reaction between tetraethylenepentamine and the fatty acids of vegetable origin contained in the distillation residues from wood, usually denoted by the term TOFA (for "Tall Oil Fatty Acids").

According to an aspect of the invention, a polyamidoamine of low reactivity, i.e. having relatively slow and controlled cross-linking kinetics, will be used.

b) Aromatic Polyamine

The use of aromatic polyamines in the hardening composition offers the following advantages:
  The reactivity of the aromatic polyamines is the slowest in the amine family. Their use contributes to control of the kinetics and of the cross-linking exotherm of the encapsulation composition constituted by polyamidoamines with more rapid kinetics.
  The presence of aromatic rings improves the mechanical properties of the epoxy-amine network that would be obtained with the polyamidoamines alone.
  The presence of phenyl groups endows the hardening composition with a hydrophobic character, thus improving the resistance to leaching of the encapsulation composition that would be obtained with the polyamidoamines alone.
  The aromatic rings present in the network increase the resistance of the material to ionizing radiation. In fact, the benzene rings have their own resonance energy, which gives the aromatic structures particular stability and good resistance to irradiation compared to the aliphatic polymers.

However, the choice of a suitable aromatic polyamine in the hardening composition requires a selection making it possible to obtain a proper equilibrium between the increase in aromaticity and the decrease in exothermic effect, so that the kinetics of the cross-linking reaction of the encapsulation composition remains compatible with industrial manufacture.

Advantageously, the aromatic polyamine that can be used for the purposes of the invention comprises at least 2 primary amine functions, preferably 2, and at least one aromatic ring, preferably 1 or 2, and has a degree of aromaticity greater than or equal to 35%.

The degree of aromaticity of the aromatic polyamine is calculated as follows and is expressed as a percentage:

$$\frac{\text{Sum of the molecular weights of the aromatic rings present in the molecule}}{\text{Molecular weight of the molecule}}$$

Preferably, for the purposes of the invention, the aromatic rings present in the molecule are benzene rings.

In particular, said aromatic polyamine has a degree of aromaticity from 35% to 70%, in particular from 38% to 65%.

Preferably, said aromatic polyamine is selected from the primary aromatic diamines.

According to a preferred aspect, the aromatic polyamine has a melting point less than or equal to 130° C., preferably from 35° C. to 130° C.

Advantageously, an aromatic polyamine will be selected that is devoid of any substance classified as "CMR" (chemicals that are carcinogenic and/or mutagenic and/or toxic for reproduction) or "SVHC" (Substance of Very High Concern).

Aromatic polyamines that are preferred for the purposes of the invention may be selected, for example, from the primary aromatic diamines, in particular from: diethylmethylbenzenediamine, 4,4'-methylene-bis[2,6-diethylaniline], 4,4'-methylene-bis(3-chloro-2,6-diethylaniline), 4,4'-methylene-bis(2,6-xylidine), 4-methyl-o-phenylenediamine, 4-aminobenzylamine and diethyltoluenediamine (DETDA), used alone or in a mixture.

Preferably at least one aromatic polyamine, preferably at least one aromatic diamine having an equivalent weight per active hydrogen of the order of 80 to 100 g/H, will be selected.

Advantageously, at least one primary aromatic polyamine will be used, preferably at least one primary aromatic diamine, having a low viscosity allowing utilization at ambient temperature between 15 and 30° C., and avoiding having recourse to the use of diluents, whether or not reactive, which would reduce the mechanical performance of the encapsulation composition. Preferably, the viscosity will be of the order of 0.1 to 1 Pa·s at 25° C.

Preferably, at least one aromatic polyamine will be used, preferably at least one aromatic diamine, reacting at ambient temperature between 15 and 30° C. without needing to supply heat.

Advantageous primary aromatic polyamines, in particular primary aromatic diamines, are those in which the symmetry of the $NH_2$ groups on the molecule leads to homogeneity of the network.

An aromatic diamine that is preferred for the purposes of the invention is diethyltoluenediamine (DETDA). DEDTA is in the form of a mixture of isomers, the predominant isomer being 3,5-diethyltoluene-2,4-diamine, which represents between 77 and 81% by weight of said mixture.

The hardening composition is preferably composed of, from 40 to 60%, preferably from 45 to 50%, of amidoamine and from 40 to 60% of aromatic polyamine, preferably 50 to 55%, the sum of the components not exceeding 100%.

Composition of the Resin

The composition of the resin that can be used in the encapsulation composition according to the invention is preferably selected in such a way that it ensures good complementarity with the hardening composition, in particular in terms of hardening kinetics and of contribution to the mechanical strength of the encapsulated waste block. This mechanical strength may be expressed in terms of compressive strength, bending strength, shear strength, viscoelastic performance, etc.

The composition of the resin can comprise a mixture containing epoxy resin as well as one or more additives, in particular selected from reactive diluents, initiators or plasticizers (unreactive), rheology modifiers, in particular thixotropic agents, surfactants of the ethoxylated fatty alcohol type or esters of fatty acids and polyols, having a role of emulsifier in the case of aqueous waste, or of wetting agent in the case of solid waste, or sequestering agents, of the EDTA type (ethylenediaminetetraacetic acid) in the case of metallic waste or waste containing metal ions, and water repellents.

The epoxy resin that can be used in the encapsulation composition for the purposes of the invention is preferably an epoxy resin of which the equivalent weight per epoxy is between 190 and 210 g/mol. Said epoxy resin optionally incorporates a reactive diluent, preferably selected from the monoepoxides or the multifunctional epoxides with viscosity of less than 0.5 Pa·s at 25° C.

Preferably, said epoxy resin will have a high degree of aromaticity, in particular from 35 to 55%, and preferably from 40 to 50%, expressed as a percentage of the molecular weight of the benzene rings to the molecular weight of the molecule.

Advantageously, the number of epoxide functions per molecule (monomer) of said epoxy resin is from 2 to 5.

Said epoxy resin will have, for example, a molecular weight in g/mol of approximately 300 to 800 g/mol, which corresponds to an equivalent weight per epoxy between 125 and 225 expressed in g/mol.

A preferred epoxy resin is a resin resulting from the reaction between bisphenol A and epichlorohydrin, in particular the resin diglycidyl ether of bisphenol A (DGEBA).

According to a preferred aspect of the invention, a mixture of epoxy resins with a functionality of at least 2 will be used, so as to increase the bond density (cross-link density) during cross-linking.

Preferably, a mixture of bifunctional epoxy resin will be used, such as a resin resulting from the reaction between bisphenol A and/or bisphenol F and epichlorohydrin, and at least one polyfunctional resin, i.e. an epoxy resin having a number of epoxy functions per monomer greater than 2, such as, for example, the epoxy resins of the phenol novolak or epoxy tris(hydroxyphenyl)methane type etc.

The composition of the resin preferably comprises a reactive epoxide diluent (with respect to the amines), preferably monofunctional or polyfunctional, and more preferably with a viscosity at 25° C. of less than 0.5 Pa·s, which participates in the reaction between the amine compounds of the hardening composition and the epoxy resin. Reactive diluents that can be used are, for example, p-tert-butylphenylglycidyl ether, cresylglycidyl ether, ethylhexylglycidyl ether or triepoxide such as trimethylolpropane triglycidyl ether, glycerol triglycidyl ether. Ethylhexylglycidyl ether will preferably be used.

The composition of the resin can comprise an unreactive diluent allowing the viscosity of the epoxy resin to be adjusted and the epoxy-amine reaction to be initiated by the catalytic action of its hydroxyl functions. This "initiator" diluent that can be used in the resin composition may be a hydrophilic solvent selected, for example, from the alcohols of molecular weight greater than or equal to 100 g/mol that are partially miscible with water. Moreover, owing to its hydrophilic character, said diluent promotes contact between the waste to be encapsulated, for example an ion-exchange resin, and the resin composition, thus promoting homogeneity of the final encapsulated waste. A compound that is preferred for this purpose is benzyl alcohol.

Advantageously, the composition of the resin of said encapsulation composition according to the invention comprises a thixotropic agent that makes it possible to control the decrease in viscosity, in particular at the start of the reaction, and helps to control the exothermic effect.

A hydrophobic thixotropic agent will preferably be used, which makes it possible in particular to obtain a uniformly encapsulated waste, by limiting the rise of the waste in the encapsulation composition when it is light, for example in the case of ion-exchange resins.

Hydrophobic thixotropic agents that can be used may be selected, for example, from hydrophobic pyrogenic silica and organophilic modified clay such as that obtained by modification by grafting a hydrophobic organic grafting agent.

Depending on the nature of the waste to be encapsulated, the resin composition can also comprise one or more surfactant(s) or sequestering agent(s) or water-repellent agent(s), as described above.

In particular, in the case of the encapsulation of ion-exchange resins, a surfactant will be used to improve the cohesion by better wetting and better adhesion between the encapsulation composition and the ion-exchange resin to be encapsulated.

A non-ionic surfactant will preferably be used in this case, in particular a hydrophilic non-ionic surfactant that is not diluted in water (anhydrous), such as, for example, those selected from the ethoxylated fatty alcohols and the siloxane polyethers.

Water repellents, such as, for example, trimethoxy(methyl)silane, siloxane modified polyester, or also preferably a water-repellent agent comprising an epoxide function capable of creating a bond with an amine function of the hardening composition, such as glycidoxypropyltrimethyloxysiloxane, can also be used advantageously.

In the case of other wastes to be encapsulated, in particular for encapsulating metals, for example a suitable sequestering or complexing agent will be used, comprising groups that interact with the metallic element to be encapsulated, for example $-CO_2H$ groups, such as EDTA.

The type of surfactant or sequestering agent to be included in the resin composition can be varied depending on the requirements and the desired effect.

Preferably, the resin composition comprises, with respect to the total weight of the resin composition:
- 70 to 90% by weight of an epoxy resin or of an epoxy resin mixture, preferably 85 to 90%,
- 5 to 15% by weight of a reactive diluent, preferably 8 to 12%,
- 5 to 15% by weight of a plasticizing diluent, preferably 5 to 10%,
- 0 to 3% by weight of a thixotropic agent, preferably 1 to 2%, and
- 0 to 2% of at least one surfactant or sequestering agent or water repellent,
- the sum of the components of the resin composition not exceeding 100%.

Optionally, after mixing the hardening composition and the resin composition, a reinforcing additive for improving the mechanical properties as well as the resistance to radiation of the encapsulated waste block may also be added to the encapsulation composition, for example at a rate from 0 to 10% of the total weight of the encapsulation composition.

It is possible to use, for example, short glass fibres, carbon fibres, ceramic fibres or synthetic organic fibres, glass, carbon and ceramic fibres being preferred. The choice of the type of material or reinforcing additive will depend on the required level of the strength properties.

The invention also relates to the use of an encapsulation composition as defined above for preparing an encapsulated waste block, as well as the encapsulated waste block thus obtained.

In particular, said encapsulated waste block may comprise from 30 to 60% by weight of encapsulation composition and from 70 to 40% by weight of waste.

Said encapsulated waste block can be prepared by a method comprising the steps consisting of:
i) preparing an encapsulation composition by mixing a resin composition and a hardening composition as defined above, and
ii) incorporating the waste to be encapsulated in said encapsulation composition, and
iii) encapsulating and cross-linking until a cured encapsulated waste block is obtained.

Optionally, a reinforcing additive will be added to the encapsulation composition in an intermediate step prior to incorporation of the waste to be encapsulated and after preparation of the encapsulation composition.

Mixing of the resin composition and hardening composition can be carried out, for example, at a temperature from 15 to 30° C. If necessary, the resin composition, on the one hand, and the hardening composition, on the other hand, can be heated or cooled before mixing, in particular to a temperature from 20 to 25° C.

The waste to be encapsulated may be a waste in solid form, optionally in a divided state, or in semi-liquid form, such as a mud or a viscous paste.

In particular, the encapsulation composition can be used for the storage or containment of radioactive wastes, for example anionic or cationic ion-exchange resins and mixtures thereof, contaminated magnesium rods, irradiated metallic components such as components irradiated with low or medium radioactivity, or radioactive ash. Therefore, the composition according to the invention is particularly useful and is used for the encapsulation and storage and/or containment of waste that is toxic to health and/or the environment.

The encapsulation composition may alternatively be used for the storage or containment of toxic waste that is not radioactive, for example heavy metals or materials containing them, metallic components in a divided state originating from the dismantling of industrial workshops or from products generating or releasing harmful substances, such as dioxin, phosgene, $NH_3$, morpholine, hydrazine, $SO_2$ or $SO_3$.

The waste encapsulated in the encapsulation composition according to the invention, in the form of a block, has high properties of compressive strength, as well as good chemical resistance to attack by acidic or basic agents, or oxidizing agents and light, as well as high resistance to leaching. It has good mechanical performance in compression, in particular after exposure to ionizing radiation, as well as shear strength, with excellent dynamic mechanical performance.

The invention is illustrated by the following non-limitative examples.

EXAMPLE 1

Preparation of an Encapsulation Composition

The following encapsulation composition was prepared:
1) Epoxy resin composition

| Component | Content (% by weight) |
|---|---|
| Diglycidyl ether of bisphenol A (DGEBA) epoxy resin, functionality f = 2 | 89 |
| ethylhexyldiglycidyl ether (reactive diluent), epoxy functionality = 2 | 6.9 |
| Benzyl alcohol (plasticizing diluent) | 2.9 |
| Hydrophobic pyrogenic silica (thixotropic agent) | 1.2 |

2) Hardening composition with 31.75 parts of hardener composition per 100 parts of epoxy resin composition (i.e. 24.1% of hardener)

| Component | Content (% by weight) |
|---|---|
| Product of the reaction between tetraethylenepentamine and fatty acids of vegetable origin contained in wood distillation residues (TOFA) (Ancamide 506 from AIR PRODUCTS) | 55 |
| DETDA (lonzacure DETDA 80 from LONZA) Degree of aromaticity = 41% | 45 |

Mixing was carried out by kneading the resin composition with the hardening composition for 5 to 10 min at ambient temperature between 15 and 30° C., these compositions having been assayed beforehand and brought to a temperature of 20 to 25° C. The degree of aromaticity of the encapsulation composition is 36.4%. This high degree of aromaticity allows the encapsulation composition obtained to meet the required technical specifications with respect to resistance to ionizing radiation and mechanical strength.

The waste to be encapsulated is incorporated immediately after mixing.

Example 2

Encapsulation of an Ion-Exchange Resin 58 kg of epoxy resin composition and 28 kg of hardening composition from Example 1 are mixed together in a 200-litre metal drum.

The mixture is kneaded using a mixing rotor with a diameter of 520 mm, with a single stage and 4 blades with a width of 200 mm oriented at 45°, with a stirrer at a speed of 60 rpm for 1 to 2 min.

119 kg of ionically equilibrated polystyrene or acrylic ion-exchange resins (Amberlite MB20 from ROHM&HAAS) are then added to the mixture immediately at a flow rate of 500 kg/h, with stirring, and then the whole is mixed for 7 min at 60 rev/min, and then for 7 min at 140 rpm.

After stopping for 5 min for degassing, the mixture is homogenized for 5 min at 140 rpm.

A 205 kg block of encapsulated ion-exchange resin is obtained.

In terms of kinetics and exotherm, the values measured during polymerization also meet the specifications of the Agence nationale de gestion des déchets radioactifs (AN-DRA) [French national radioactive waste management agency] and in particular comply with a maximum temperature reached below 90° C., which meets the technical specifications required in terms of kinetics.

The results obtained in the test performed according to Examples 1 and 2 show that the performance in terms of compressive strength meets the ANDRA requirements, namely a value of breaking stress above 8 MPa, which meets the required technical specifications in terms of mechanical strength.

The invention claimed is:

1. An encapsulation composition for the storage or confinement of toxic waste, comprising:
   a resin composition containing at least one epoxy resin, and
   a hardening composition containing at least one polyamidoamine and at least one aromatic polyamine,
   said encapsulation composition having a degree of aromaticity greater than or equal to 35%, said degree of aromaticity being defined as follows and expressed as a percentage:

$$\frac{\text{sum of the molecular weights of the aromatic rings present in the encapsulation composition and included in the polymer chain}}{\text{sum of the molecular weights of all of the components of the encapsulation composition.}}$$

2. The composition according to claim 1, wherein the composition comprises from 50 to 80% by weight of the resin composition based on epoxy resin and from 20 to 50% by weight of the hardening composition.

3. The composition according to claim 1, wherein said polyamidoamine has an amine index, corresponding to an equivalent weight per active hydrogen, of the order of 90 to 110 g/H.

4. An encapsulation composition for the storage or confinement of toxic waste, comprising:
   a resin composition containing at least one epoxy resin, and
   a hardening composition containing at least one polyamidoamine and at least one aromatic polyamine, wherein said polyamidoamine is a product of the reaction between one or more aliphatic polyethylene polyamine(s) and one or more mono- or polyunsaturated $C_{12}$-$C_{18}$ fatty acid(s),
   said encapsulation composition having a degree of aromaticity greater than or equal to 35%, said degree of aromaticity being defined as follows and expressed as a percentage:

sum of the molecular weights of the aromatic rings present in the encapsulation composition and included in the polymer chain
sum of the molecular weights of all of the components of the encapsulation composition.

5. The composition according to claim 4, wherein the aliphatic polyethylene polyamine is an polyethylenetetramine or an polyethylenepentamine.

6. The composition according to claim 4, wherein the aliphatic polyethylene polyamine is diethylenetriamine, triethylenetetramine, tetraethylenetetramine, tetraethylenepentamine or bis(3-aminopropyl)ethylenediamine.

7. The composition according to claim 1, wherein said aromatic polyamine has a degree of aromaticity from 35% to 70%, said degree of aromaticity being defined as follows and expressed as a percentage:

$$\frac{\text{sum of the molecular weights of the aromatic rings present in the molecule}}{\text{molecular weight of the molecule.}}$$

8. The composition according to claim 1, wherein said aromatic polyamine has a melting point less than or equal to 130° C.

9. The composition according to claim 1, wherein said aromatic polyamine has an equivalent weight per active hydrogen of the order of 80 to 100 g/H.

10. The composition according to claim 1, wherein the aromatic polyamine is a primary diamine.

11. The composition according to claim 1, wherein said aromatic polyamine is diethylmethylbenzenediamine, 4,4'-methylene-bis[2,6-diethylaniline], 4,4'-methylene-bis(3-chloro-2,6-diethylaniline), 4,4'-methylene-bis(2,6-xylidine), 4-methyl-o-phenylenediamine, 4-aminobenzylamine and diethyltoluenediamine (DETDA), used alone or in a mixture thereof.

12. The composition according to claim 1, wherein the polyamidoamine is the product of the reaction between tetraethylenepentamine and the fatty acids of vegetable origin contained in the distillation residues of wood (TOFA) and the aromatic polyamine is diethyltoluenediamine (DETDA).

13. The composition according to claim 1, wherein the resin composition comprises an epoxy resin of which the equivalent weight per epoxy is between 190 and 210 g/mol and in that the number of epoxy functions per molecule (monomer) of said epoxy resin is from 2 to 5.

14. The composition according to claim 12, wherein said epoxy resin is a resin resulting from the reaction between bisphenol A and/or bisphenol F and epichlorohydrin.

15. The composition according to claim 12, wherein the epoxy resin used is a mixture of resin resulting from the reaction between bisphenol A and/or bisphenol F and epichlorohydrin.

16. The composition according to claim 13, wherein the resin composition comprises, relative to the total weight of the resin composition:
   70 to 90% by weight of at least one epoxy resin,
   5 to 15% by weight of a reactive diluent,
   5 to 15% by weight of a plasticizing diluent,
   0 to 3% by weight of a thixotropic agent, and 0 to 2% of at least one surfactant, or sequestering agent, or water-repellent agent, the sum of the components of the resin composition not exceeding 100%.

17. A method for preparing an encapsulated waste block comprising:
   (i) preparing an encapsulation composition by mixing a resin composition and a hardening composition as defined in claim 1, and
   (ii) incorporating the waste to be encapsulated in said encapsulation composition, and
   (iii) encapsulating and cross-linking until a cured encapsulated waste block is obtained.

18. The method according to claim 17, wherein mixing the resin composition and hardening composition is carried out at a temperature of 15 to 30° C.

19. The method according to claim 17, wherein at least one of the following conditions is fulfilled:
   the waste to be encapsulated is in solid form or in semi-liquid form;
   the waste to be encapsulated is a radioactive or non-radioactive waste;
   said waste is anionic or cationic ion-exchange resins and mixtures thereof, contaminated magnesium rods, irradiated metallic components, radioactive ash, from heavy metals or materials containing them, metallic components in divided form originating from the dismantling of industrial workshops, or products generating or releasing harmful substances; and/or
   said encapsulated waste block comprises from 30 to 60% by weight of encapsulation composition and from 70 to 40% by weight of waste.

20. The composition according to claim 1, wherein the composition has a degree of aromaticity from 35% to 45%.

21. The composition according to claim 7, wherein said aromatic polyamine has a degree of aromaticity from 38% to 65%.

22. The composition according to claim 8, wherein said aromatic polyamine has a melting point from 35° C. to 130° C.

23. The composition according to claim 15, wherein the epoxy resin used is a mixture of resin resulting from the reaction between bisphenol A and epichlorohydrin, which is the resin diglycidyl ether of bisphenol A (DGEBA).

24. The composition according to claim 16, wherein the resin composition comprises, relative to the total weight of the resin composition:
   85 to 90% by weight of at least one epoxy resin,
   8 to 12% by weight of a reactive diluent,
   5 to 10% by weight of a plasticizing diluent,
   1 to 2% by weight of a thixotropic agent, and
   0 to 2% of at least one surfactant, or sequestering agent, or water-repellent agent, the sum of the components of the resin composition not exceeding 100%.

* * * * *